United States Patent
Meinders (10) Patent No.: US 7,395,756 B2
(45) Date of Patent: Jul. 8, 2008

(54) ROUND BALER WITH A SPLIT BELT TENSIONER

(75) Inventor: Calvin D Meinders, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 11/424,453

(22) Filed: Jun. 15, 2006

(65) Prior Publication Data

US 2007/0289454 A1 Dec. 20, 2007

(51) Int. Cl.
*B30B 5/04* (2006.01)
(52) U.S. Cl. .............................. 100/87; 100/88; 56/341
(58) Field of Classification Search ................... 100/87, 100/88, 89; 56/341, 343
See application file for complete search history.

(56) References Cited

U.S. PATENT DOCUMENTS 5,768,986 A * 6/1998 Arnold et al. ................. 100/88
6,094,900 A * 8/2000 Underhill et al. .............. 56/341
6,233,913 B1 * 5/2001 Roth et al. .................... 56/341
6,745,680 B2 * 6/2004 Viaud et al. ................... 100/88

OTHER PUBLICATIONS 2 pages—entitled Presse A' Balles Rondes showing a VARIO 1800 baler.
2 pages showing a McCormick Round Baler VB 12.18.

* cited by examiner

*Primary Examiner*—Jimmy T. Nguyen
(74) *Attorney, Agent, or Firm*—Sturm & Fix LLP (57) ABSTRACT

A belt tensioning system provides an improved starting principle in a large, round baler for agricultural crops. The tensioner comprises two arms, pivotally attached to one another. The front arm is pivotally attached to the baler. The rear arm is pivotally attached to the front arm, and may pivot downward under gravity when the bale chamber is empty of crop material. When pivoted down, the rear arm lowers the top of the bale forming region in the chamber, as defined by the belts. Additionally, the portion of each of the belts making up the rear of the bale forming region are reoriented in a more horizontal orientation, thus providing a forward force to aid in breaking the crop material and urging it forward to start the rolling of the bale.

4 Claims, 7 Drawing Sheets

ROUND BALER WITH A SPLIT BELT TENSIONER

CROSS REFERENCE TO RELATED APPLICATIONS

None.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The principles disclosed relate to improvements to round balers used for harvesting agricultural crops. The invention relates particularly to a method and apparatus for forming the initial shape of the bale chamber to better ensure the start of the bale formation.

2. Background Art

Large, cylindrical balers have been on the market for a number of years. U.S. patent application Ser. No. 10/719,460, filed on Nov. 21, 2003, now U.S. Pat. No. 7,181,900, which is hereby incorporated by reference, discloses many aspects of a large round baler. In particular, the illustrations show the variation in the configuration of the belts as the bale is formed.

The formation of a bale in a large cylindrical baler begins when the initial crop material enters the bale forming chamber from the entry near the baler's front. Immediately, the direction the initial crop material is traveling must reverse so it may begin rotating to initiate a large, cylindrical bale.

The initial shape of the bale forming chamber is defined by the initial configuration of the belts. A tensioner is provided to maintain appropriate tension on the belts throughout the bale forming operation. Depending on the type of crop and its condition, such as length, rigidity, etc., there may be some resistance to reversing the direction of the initial crop material. In this case, the initialization of the bale may not occur, resulting in a clogged baler and a delay in the baling process.

Some balers make use of a device for shaping the bale chamber and a second device for tensioning the belt. It will be understood this adds complexity and cost to the baler, while increasing the number of moving parts and the consequent maintenance and failure rate.

Figure 1A:
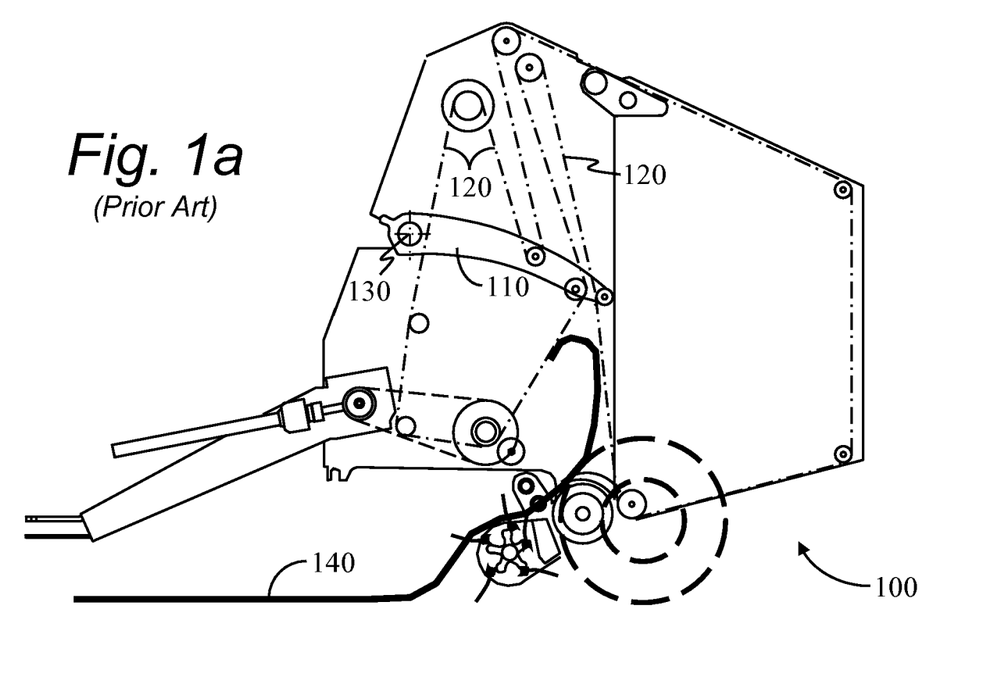
FIG. 1a is a side elevation view of a round baler of the prior art.
Figure 1B:
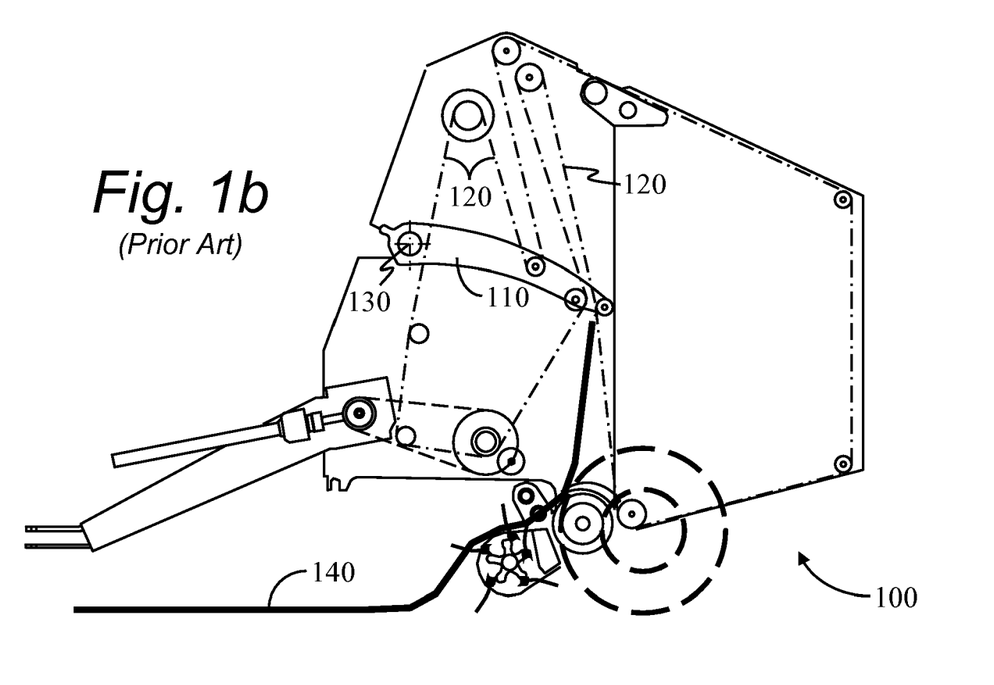
FIG. 1b is a side elevation view of a round baler of the prior art showing a limitation in said prior art.

The prior art large round baler 100 is illustrated in FIGS. 1a and 1b. The one-piece tensioner arm 110 is clearly shown tensioning the belts 120 in a bale starting position. As the bale grows, the tensioner arm 110 pivots counterclockwise about a pivotal axis 130 to allow the bale to grow and to continue to provide tension to the belts 120.

As long as the crop 140 is able to break over and begin to curl forward, as shown in FIG. 1a, the bale will initiate and begin to grow. A problem occurs if the crop 140 does not break over, as shown in FIG. 1b. In this latter case, the bale is not likely to initialize, instead, the crop 140 will begin to clog up in the baler 100.

Therefore, there is a need for a large round baler with a tensioner providing both belt tension throughout the bale forming process and the initial bale forming chamber shape to better ensure the initialization of the bale.

BRIEF SUMMARY

The starting principle is important for large, cylindrical balers. The starting principle relates to initializing the bale with the very first crop that enters the previously empty baling chamber. A force must be provided, preferably by the belts, to force the top of the crop material in the bale forming chamber forward and cause it to break over so it will begin to roll. This force is most often provided by the belts in the bale forming chamber.

In prior art balers, the front belt sometimes provided too vertical a force to bring the top of the crop forward to break it over. A novel design for the belt tensioner arm has proved a solution to this problem. This novel belt tensioner arm comprises two parts. A forward part remains in the same configuration as in the prior art and provides tension to the belt by stretching the belt downward with a forward-most idler roller. A rearward part of the tensioner arm comprises two idler rollers and tends to draw the more vertical portions of the belt together at the top of the bale forming region. This rearward portion is pivotally attached near its forward end to the forward part of the belt tensioner arm. The rearward end of the rearward part of the belt tensioner arm may drop under the influence of gravity, thereby lowering the top of the bale forming region and forcing the belt to be more horizontal in the back of the bale forming region. Hence, the force required to bend and break the crop material over to the front is better provided by the belt.

DETAILED DESCRIPTION OF THE INVENTION

With reference now to the various figures in which identical elements are numbered identically throughout, a description of various exemplary aspects of the present invention will now be provided. The preferred embodiments are shown in the drawings and described with the understanding that the present disclosure is to be considered an exemplification of the invention and is not intended to limit the invention to the embodiments disclosed. Any references, herein, to directions will be determined by facing in the direction of travel of the baler during normal operation.

Figure 11:
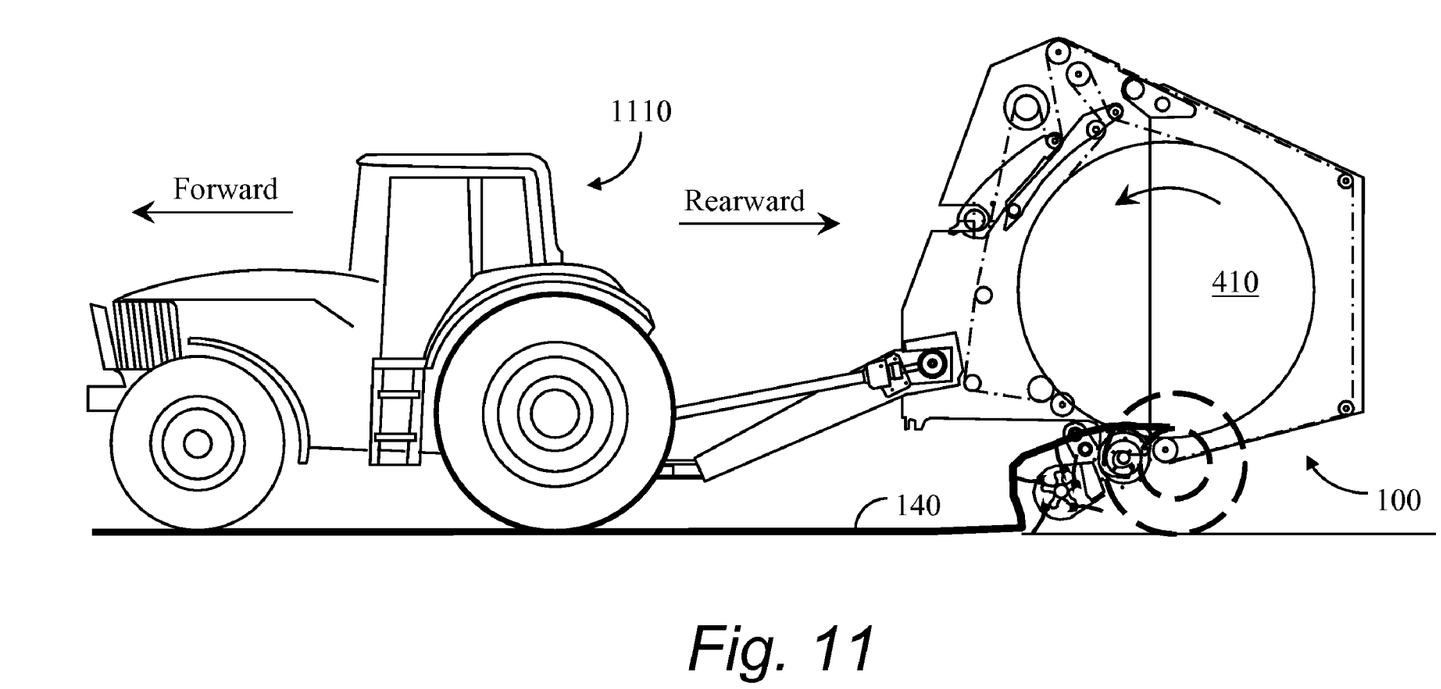
FIG. 11 is a side elevation view of a round baler being towed by an agricultural tractor.

The direction of travel when the baler is in operation, picking up crop material and forming a bale, is hereby defined as the forward direction, and is illustrated in FIG. 11 by an arrow above the tractor 1110. The opposite direction is hereby defined as the rearward direction, also depicted in FIG. 11. The baler and components, then, have a forward end or side and a rearward end or side. These definitions will be used throughout this specification, including the claims.

Figure 2A:
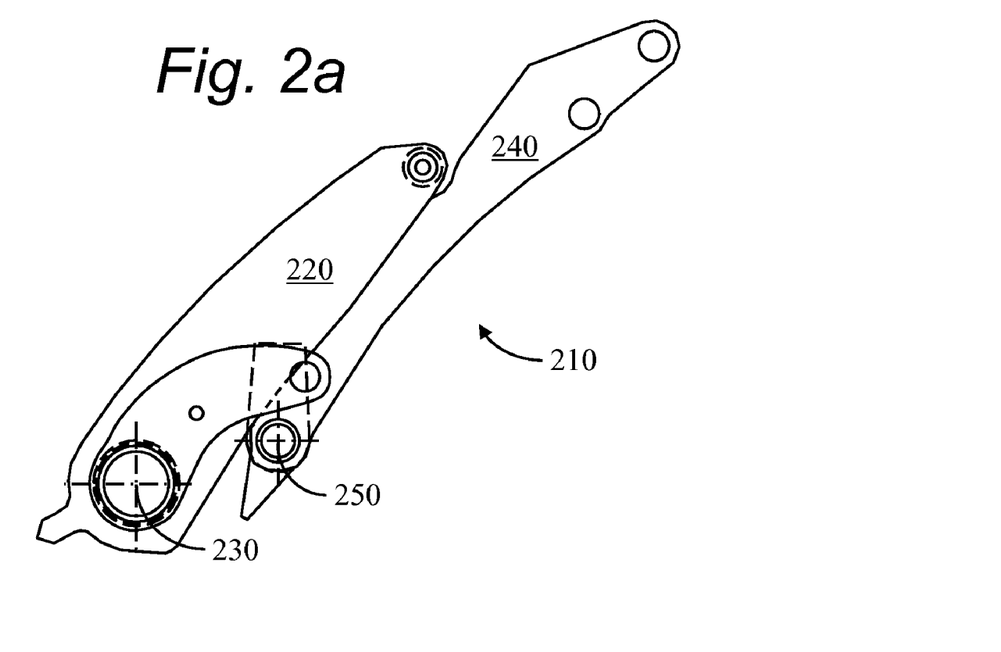
FIG. 2a is a side elevation view of the belt tensioner of the present invention.
Figure 2B:
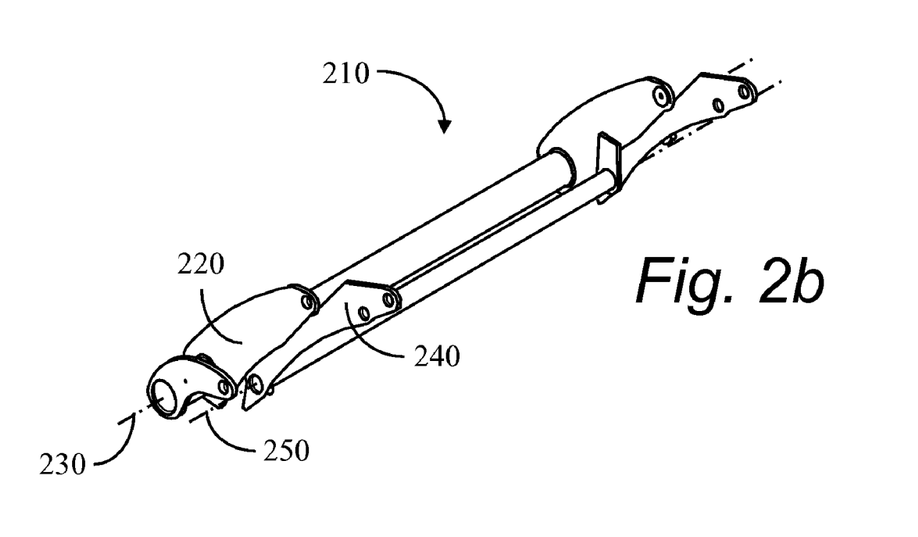
FIG. 2b is a perspective view of the belt tensioner.
Figure 3:
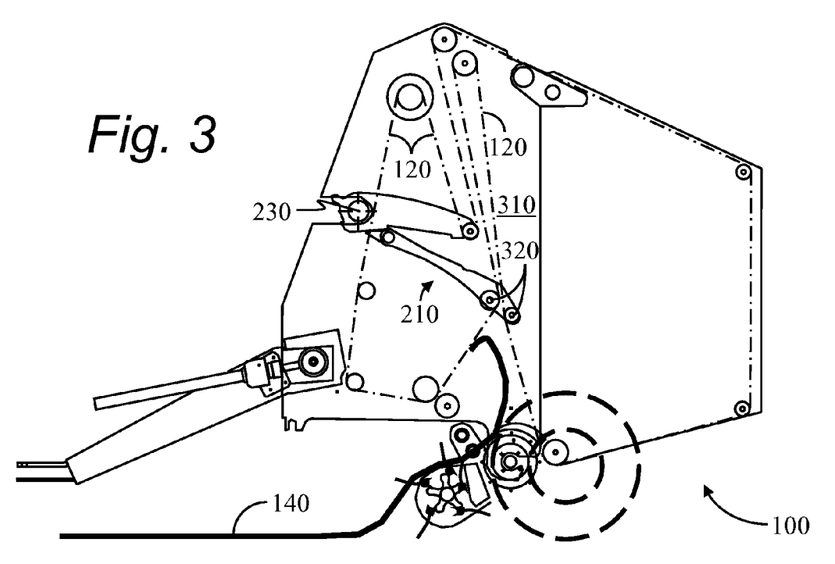
FIG. 3 is a side elevation view of a round baler showing a first embodiment of the belt tensioner in its starting position.
Figure 4:
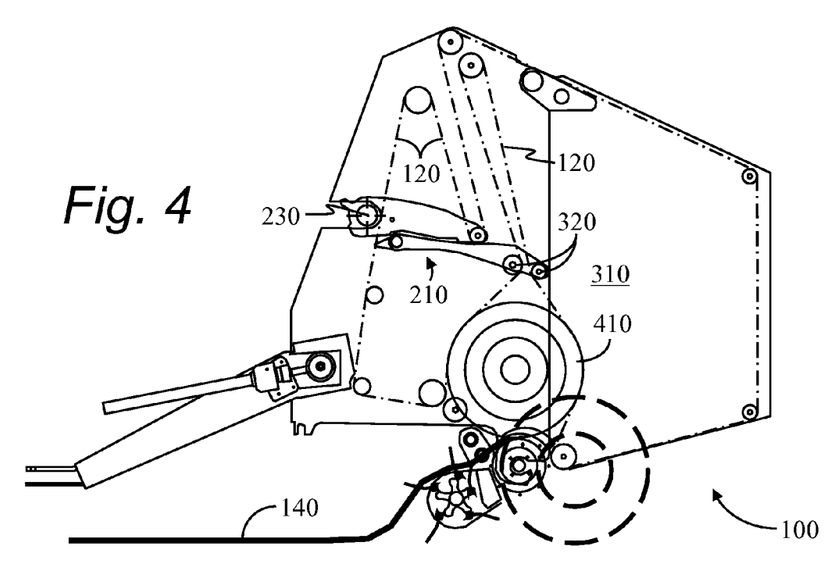
FIG. 4 is a side elevation view of a round baler showing the first embodiment of the belt tensioner in its bale-forming position.

The first embodiment of the split belt tensioner 210 of the present invention is illustrated in FIG. 2 in various orientations, and installed in a baler 100 in FIGS. 3-4. A forward member 220 of the split belt tensioner 210 is pivotally attached at a first pivotal axis 230 identical to the prior art. Articulation about this first pivot axis 230 is by an actuator, preferably a hydraulic cylinder (not shown) as per the prior art.

A rearward member 240 of the split belt tensioner 210 is pivotally attached at a second pivotal axis 250 to the forward member 220 of the split belt tensioner 210. When the bale forming chamber 310 is void of crop material, the rearward member 240 of the split belt tensioner 210 is in a lowered position, as shown in FIG. 3. This lowered position is achieved by pivoting the rearward member 240 of the split belt tensioner 210 about the second pivot axis 250 under the force of gravity.

A plurality of baler belts 120 all bear on and are guided by idler rollers 320, rotationally attached to the reward member. The rollers 320 define the shape of the top of the bale forming region inside the belts 120. In particular, when the rearward member 240 is in its lower position, the rollers 320 lower the top of the initial bale forming region and force the belts at the rear of the bale forming region into a more horizontal orientation than if the rearward member 240 remains in its upper position. That is, the angles of elevation of the belts below the rearmost roller 320 decrease. Comparing FIG. 3 with FIG. 4 clearly shows the effect of this rearward member 240 in its lower position (FIG. 3) and its upper position (FIG. 4).

As can be seen, again by comparing FIGS. 3 and 4, once the crop 140 has successfully begun to roll into a forming bale 410 (FIG. 4), the rearward member 240 of the split belt tensioner 210 returns to a place adjacent to the forward member 220 of the split belt tensioner 210. After the rearward member 240 returns adjacent to the forward member 220, the split belt tensioner 210 functions as the solid belt tensioner 110 of the prior art. As with the solid belt tensioner 110 of the prior art, as the bale grows, the entire assembly of the split belt tensioner 210 rotates counterclockwise (according to the orientation of the views in FIGS. 3 and 4) as a unit about the pivotal axis 230.

Figure 5:
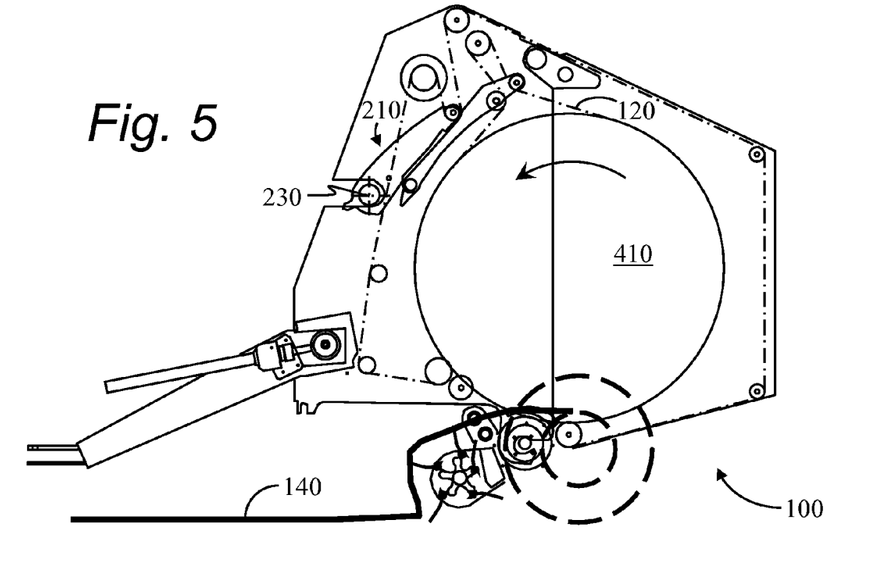
FIG. 5 is a side elevation view of a round baler showing a formed bale and the first embodiment of the belt tensioner in a position to provide room for the bale.

A large, round baler with a fully, or nearly fully, formed bale 410 is shown in FIG. 5. The split belt tensioner 210 has pivoted as a unit about the pivotal axis 230 to make room for the growing bale 410 and, at the same time, to allow the belt 120 to wrap around the bale 410.

Figure 6:
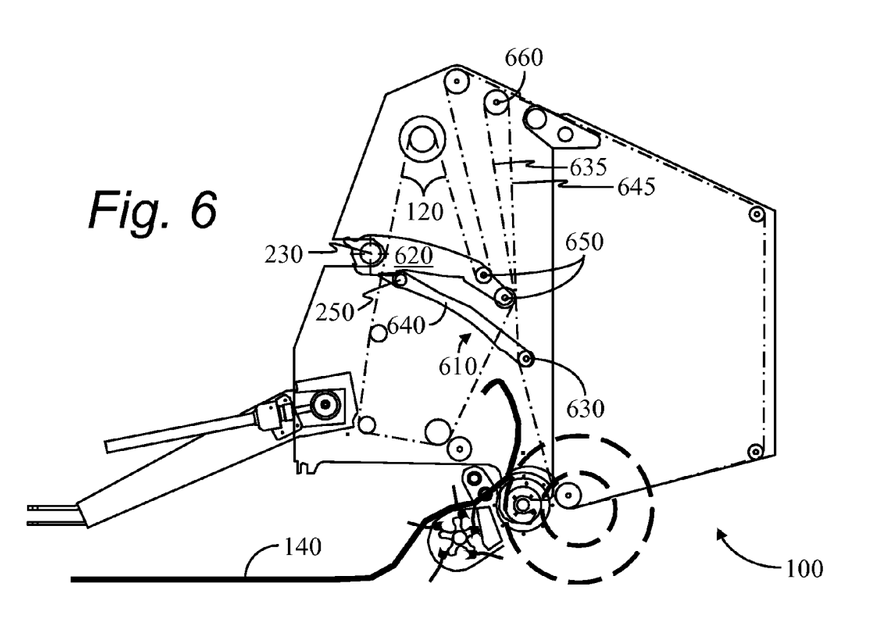
FIG. 6 is a side elevation view of a round baler showing a second embodiment of the belt tensioner in its starting position.

A second embodiment of a split belt tensioner 610 is illustrated in FIG. 6. In this embodiment, the rearward member 640 comprises an idler roller 630 and the forward member 620 comprises a pair of idler rollers 650. As before, the rearward member 640 of the split belt tensioner 610 is pivotally attached at a second pivotal axis 250 to the forward member 620 of the split belt tensioner 610. Also as with the first embodiment, when the rearward member 640 is in its lower position, the idler roller 630 forces the belts at the rear of the bale forming region 310 into a more horizontal orientation than if the rearward member 640 remains in its upper position. Again, the angles of elevation of the belts below the idler roller 630 decrease, providing the force needed to bring the crop material 140 forward to begin to roll into a bale 410. Shortly after the bale 410 begins to form, the rearward member 640 rotates counterclockwise about its pivotal axis 250 to be adjacent to the forward member 620. As the bale 410 forms, the rearward member 640 remains stationary relative to the forward member 620, to the two members 620, 640 operate as a unit like the prior art tensioner 110.

The rearmost upper roller 660 has been repositioned for this second embodiment compared to the first embodiment to reduce the chance the loops of belt 635, 645 come into contact with one another, especially when the rearward member 640 is in its lower position.

Figure 7:
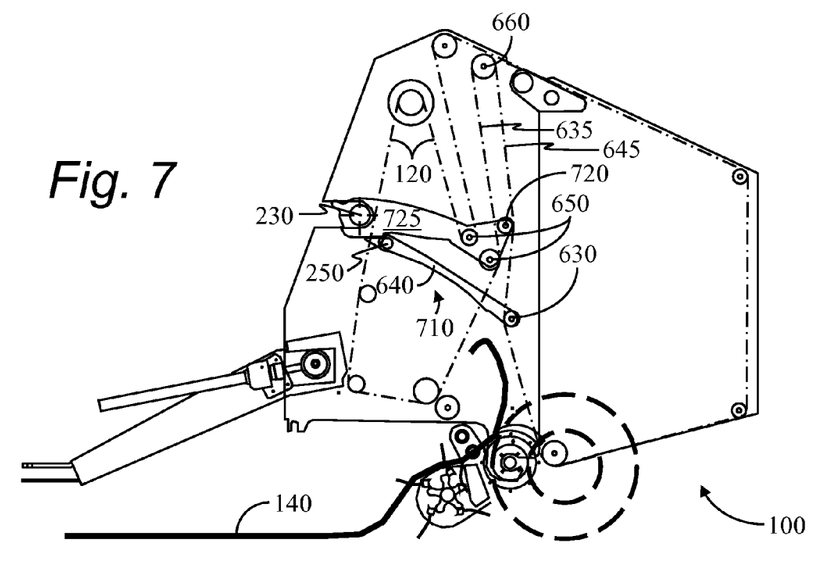
FIG. 7 is a side elevation view of a round baler showing a third embodiment of the belt tensioner in its starting position.

A third embodiment of the split belt tensioner 710 represents a modification to the second embodiment of the split belt tensioner 610, and is shown in FIG. 7.

In this third embodiment, a third idler roller 720 has been added to the forward member 725. The third idler roller 720 is provided to maintain a separation between the loops 630, 640 of the belt above the forward member 725. The possible need for this is clearly shown by comparing these belt loops 635, 645 in FIG. 6 to those in FIG. 7.

Figure 8:
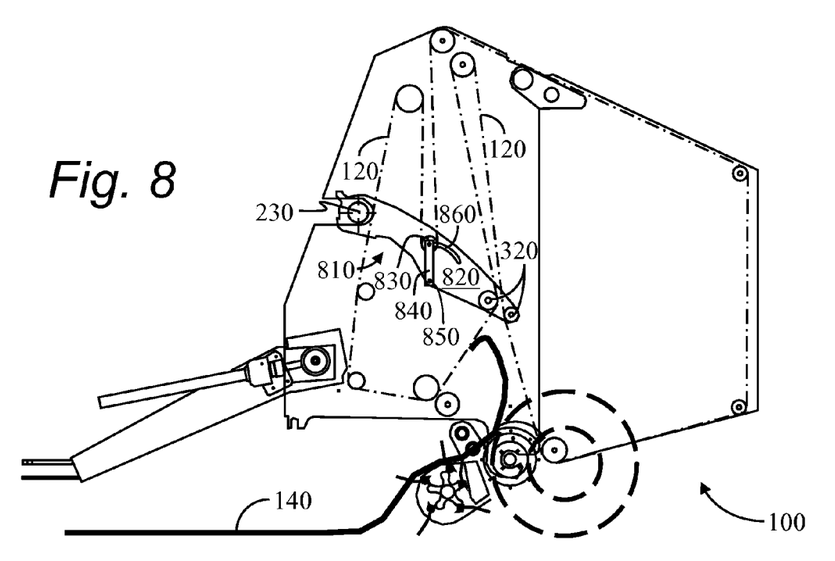
FIG. 8 is a side elevation view of a round baler showing a fourth embodiment of the belt tensioner in its starting position.

A fourth embodiment of the split belt tensioner 810 is shown in FIG. 8. A main member 820 pivots on the axis 230 as usual. A forward roller 830, providing take-up of the belt 120, is rotatably affixed to a pivot arm 840, which pivots about an axis 850 relative to the main member 820. A guide slot 860 provides positive stops at the forward and rearward ends of travel of the pivot arm 840.

In its extreme forward position, the forward roller 830 takes up less belt 120 length than it would if it was restricted to its extreme rearward position. Therefore, the split belt tensioner 810 is able to pivot about its axis 230 to a lower position because the forward roller 830 pivots with the pivot arm 840. Hence, the starting bale forming chamber is enhanced by providing the forward roller 830 with the ability to move forward and backward relative to the main member 820.

Figure 9:
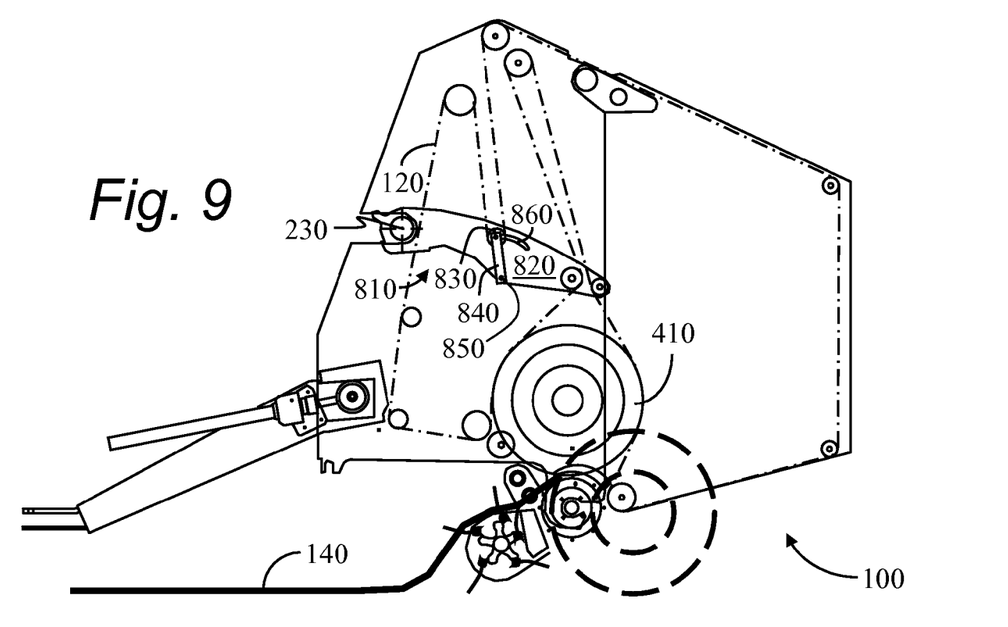
FIG. 9 is a side elevation view of a round baler showing the fourth embodiment of the belt tensioner in its bale-forming position.

In FIG. 9, a bale 410 is beginning to form and the split belt tensioner 810 is beginning to rotate counterclockwise about its axis 230. The pivot arm 840 is also pivoting about its axis 850, keeping proper tension on the belts 120.

Figure 10:
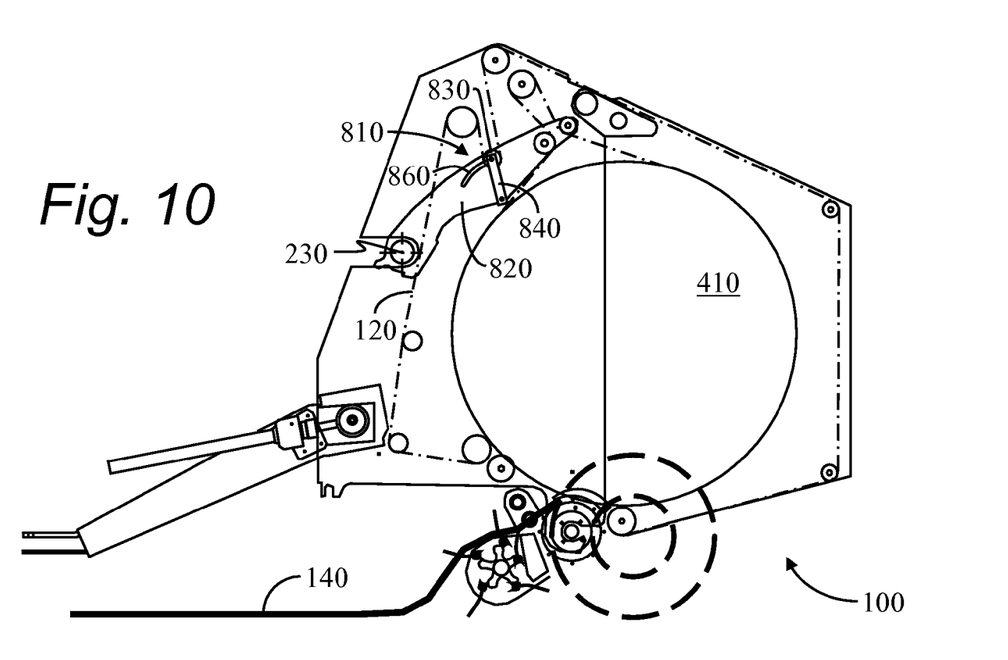
FIG. 10 is a side elevation view of a round baler showing a formed bale and the fourth embodiment of the belt tensioner in a position to provide room for the bale.

In FIG. 10, a fully formed bale 410 is shown. The split belt tensioner 810 is pivoted to an extreme upper position, while the pivot arm 840 has pivoted to the rearward stop point of the guide slot 860, again taking up the proper amount of belt 120 length.

In FIG. 11, a large, round baler 100 of the present invention is shown being towed by the agricultural tractor 1110 in the normal fashion.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

The invention claimed is:

1. An apparatus for tensioning a belt in a baler for baling large, cylindrical bales, the apparatus comprising:

a bale forming chamber;

a split tensioner comprising a first member operatively, pivotally attached to the baler on a first pivotal axis and a second member operatively, pivotally attached to the first member;

at least one belt providing forces to roll crop material into the large, cylindrical bale;

a first idler roller operatively, rotatably attached to the first member;

a second idler roller operatively, rotatably attached to the second member at a rotational axis, the at least one belt being engaged by the first idler roller and the second idler roller;

a second pivotal axis at which the second member is operatively, pivotally attached to the first member, and on which the second member pivots relative to the first member such that a distance between the first idler roller and the second idler roller varies as the second member pivots relative to the first member, the second pivotal axis being fixed with respect to the first member, said second pivot axis being spaced from the rotational axis of the second idler roller; and a stop device to limit a range of pivot of the second member relative to the first member, said stop device comprising a stop formed in at least one of the first and second members.

2. The apparatus of claim 1 additionally comprising a third idler roller operatively, rotatably attached to the first member and wherein said second idler roller engages a section of the belt where the belt descends from a first upper pulley, wraps around the second idler roller, and ascends to a second upper pulley.

3. The apparatus of claim 2 wherein the first idler roller engages the belt in a region defining a forward portion of the bale forming chamber and the third idler roller engages the belt in a region defining a rearward portion of the bale forming chamber, a top of the bale forming chamber being defined by the belt in the vicinity of the first idler roller and the third idler roller when the first member is pivoted to a lower position.

4. The apparatus of claim 1 wherein said at least one belt comprising a plurality of belts disposed substantially parallel to one another wherein all belts are engaged to the first idler roller and the second idler roller.

* * * * *